W. T. HOOFNAGLE.
METHOD OF DISSOCIATING AND REMOVING VAPOR FROM AQUEOUS LIQUIDS.
APPLICATION FILED OCT. 23, 1905.
956,097.
Patented Apr. 26, 1910.
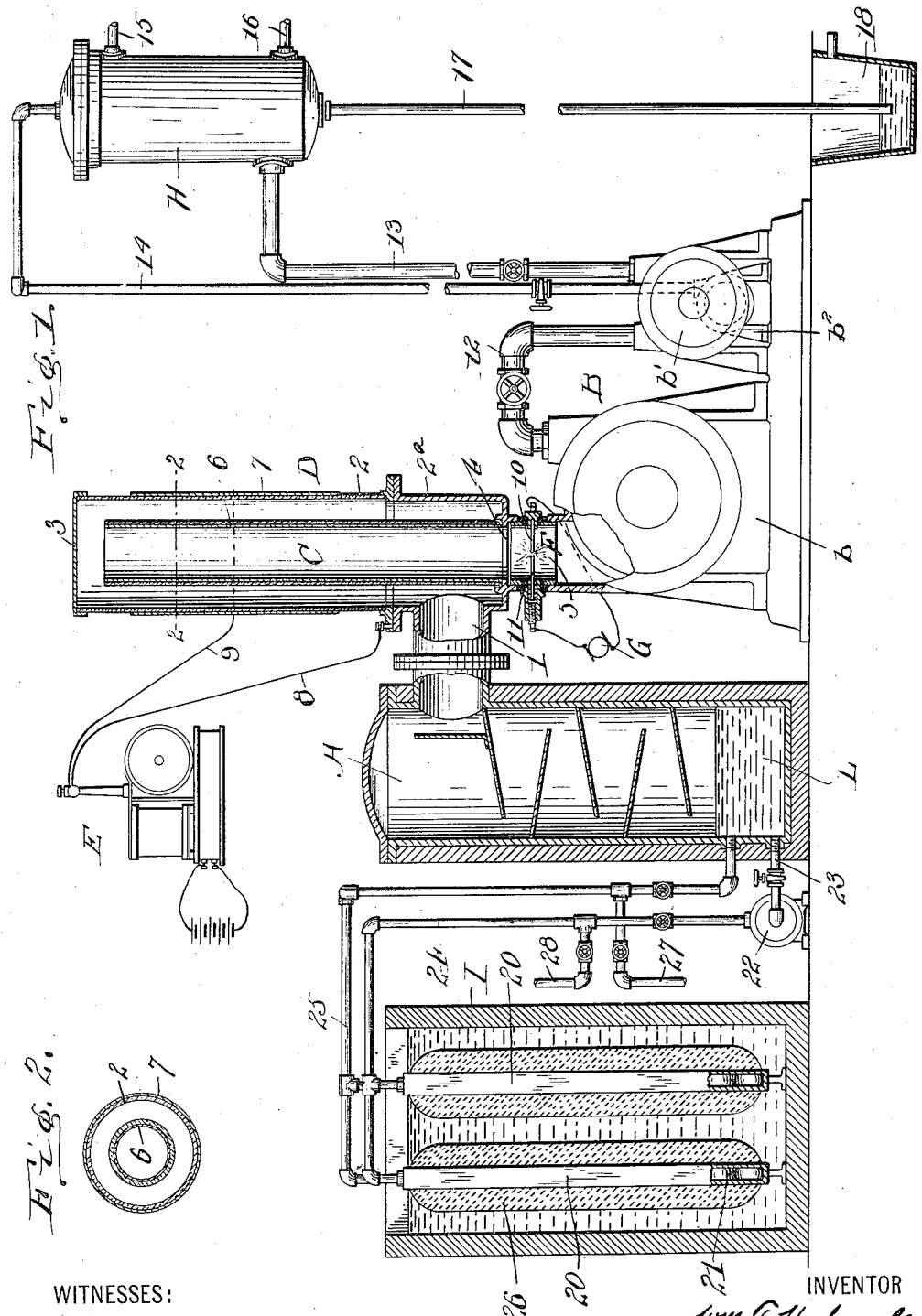
WITNESSES:
INVENTOR
Wm T. Hoofnagle
BY Robert Watson
ATTORNEY

UNITED STATES PATENT OFFICE.

WILLIAM T. HOOFNAGLE, OF RIDGEWOOD, NEW JERSEY.

METHOD OF DISSOCIATING AND REMOVING VAPOR FROM AQUEOUS LIQUIDS.

956,097.  Specification of Letters Patent.  Patented Apr. 26, 1910.

Application filed October 23, 1905. Serial No. 284,107.

*To all whom it may concern:*

Be it known that I, WILLIAM T. HOOF-NAGLE, a citizen of the United States, residing at Ridgewood, in the county of Bergen and State of New Jersey, have invented certain new and useful Improvements in Methods of Dissociating and Removing Vapor from Aqueous Liquids, of which the following is a specification.

In cooling liquids, by the vaporization of a portion of the liquid which is to be cooled, in a vacuum, various ways have been devised for removing the vapors from the vacuum chamber so that a high vacuum can be maintained. Usually, to supplement mechanical exhausting means, an absorbent, such as sulfuric acid, having an affinity for water, is circulated through the vacuum chamber in the path of the vapors until it becomes saturated, then through a concentrator where the water is driven off by the application of heat, and then through suitable cooling coils before returning to the absorption chamber. Chiefly for the purpose of facilitating the removal of these vapors without the use of absorbers, I have devised a novel method, set forth in the following specification, and, incidental to this chief purpose I have herein disclosed as a part of my invention a novel and highly efficient method of electrically decomposing vapors or gases into their components.

In the accompanying drawings—Figure 1 shows partly in side elevation and partly in vertical section an apparatus for carrying out my invention, and Fig. 2 is a sectional view on the line 2—2 of Fig. 1.

In the drawing an apparatus for carrying out my invention is illustrated in connection with a brine-circulating refrigerating system, although it will be evident that instead of cooling brine in a vacuum chamber and circulating the brine for external refrigeration, the method may be applied to the purpose of cooling or freezing fresh water within the vacuum chamber.

Referring to the drawing, A indicates a cooling or freezing compartment of a vacuum chamber, adapted to contain a liquid L, and B indicates suitable mechanical exhaust mechanism for creating a vacuum in said compartment, this exhaust mechanism being connected to the compartment A through a tube C and a casing D which envelops the tube and is connected to the compartment A by a suitable conduit 1. The arrangement is such that vapors passing from the compartment A to the exhaust mechanism must first pass upward through the casing D and then through the tube C. The upper portion 2 of the casing D consists of a cylindrical tube or bell of glass, or other suitable dielectric material, closed at the top by a cap 3, and the tube or cylinder C is also preferably made of glass and is concentrically arranged within the inclosing casing D. The upper end of the tube C is open and its lower end fits air-tight around an opening 4 in the bottom of the casing D. A suitable coupling 5 connects the suction end of the pump $b$ with the tube C through the opening 4.

The tube C, as shown, has an interior lining 6 of metal foil, the lower end of which is electrically connected to the metal part $2^a$ of the casing D. The glass portion 2 of said casing has an outer coating 7 of metal foil. These metal foils 6 and 7 are connected, respectively, by conductors 8 and 9 to the terminals of a suitable source of high frequency and high potential electric currents, such as the well-known Tesla oscillator, indicated in the drawing by the reference letter E. In the drawing the conductor 8 is connected to the metal portion of the casing D and the current passes from its source through said conductor and the casing to the metal foil electrode 6. The lower end of the metal foil electrode 7 is arranged at a suitable distance above the metal portion of the casing to prevent sparking between the said electrode and the casing. When high frequency current is applied to the apparatus a diffused electrical discharge takes place between the electrodes 6 and 7, thus creating a practically uniform electrical field in the path of the attenuated vapors, between the glass tubes C and D throughout the length of the electrode 7. As the vapors drawn from the water by the operation of the exhaust mechanism pass through this field, they are electrically decomposed into their gases, oxygen and hydrogen. Water, in the form of vapor, at atmospheric pressure, is much more readily decomposed by the electric current than water in liquid form at the same pressure. I have found that as the pressure is removed from the vapors the ratio of decomposition to energy expended largely increases, and that in a high vacuum, such as it is necessary to maintain in vacuum refrigerating apparatus, a practically perfect decomposition of the vapors withdrawn from the water can be accomplished with a comparatively small expenditure of electrical energy. This mixture of oxygen and hydrogen gases may be drawn out directly by the pumping mechanism and used for laboratory or other purposes if desired.

When utilizing the apparatus for refrigerating purposes, it will be evident that the gases resulting from the decomposition of the water vapor will naturally occupy more space within the vacuum chamber than the water vapor itself. I, therefore, provide means for igniting and burning, and thus recombining these gases into a dense form as close as possible to the mouth of the pump so that the dense vapor, before expanding will pass directly into the pump and the weight of vapor handled by the pump will be largely increased. As the gases and vapor move with great rapidity, and time is required for the water vapor, resulting from this recombination, to expand, these dense vapors are drawn out of the ignition chamber into the pump before expansion takes place. While all of the vapor extracted from the water or brine passes through the pump, its volume is greatly reduced owing to its dense form when entering the pump.

As shown in the drawings, an igniting device is arranged within the coupling-piece 5 directly at the mouth of the rotary pump $b$. This igniting device may be of any suitable kind which will ignite the gases, although, preferably, this device should not itself give off a great quantity of heat. A high tension current may be employed to give a practically constant series of sparks. In the drawings, the device shown consists of a pair of electrodes 10 and 11 projecting toward one another within the coupling-piece 5 and these electrodes are connected to any suitable source of electrical energy G for maintaining a flow of current between the ends of the electrodes, which may be of any suitable material.

In the drawing a series of rotary pumps for exhausting the vapor is shown for the reason that the igniting device can be brought close to the buckets of the pump and the vapor is instantly and constantly withdrawn when formed at the igniting device. In the drawing the pumps are shown in outline, $b$ indicating the low compression pump, $b'$ the intermediate pump and $b^2$ the high compression pump. The low and intermediate pumps, as shown, are connected by a pipe 12 and the compression side of the intermediate pump is connected by a pipe 13 to a condenser H. The condenser has suitable inlet and outlet pipes 15 and 16, respectively, for the circulation of cooling water through its coils, and a pipe 17 extends downwardly from the condenser into a well 18 so that the water of condensation from the vapors is carried into the well. The well is at a suitable distance below the condenser, and the pipe 17 extends beneath the water in the well so that air cannot be drawn into the condenser, nor can water in the well be drawn into the condenser on account of the height of the latter above the water.

While as stated the method and apparatus above described may be applied to the vaporization of fresh water or the manufacture of ice therefrom within the vacuum chamber, yet in the drawing I have illustrated it as employed in connection with a brine circulating system of refrigeration. In the drawing I indicates a tank containing fresh water within which are arranged flat metal casings 20, shown in edge view in the drawing, and containing coils 21, through which brine is circulated by means of a pump 22. A suction pipe 23 extends from the pump into the cooling or vacuum chamber A and the brine L is drawn from said chamber by the pump and forced through a pipe 24 to the coils in the flat casings 20. The brine is returned from these coils to the vacuum chamber through a pipe 25. When the apparatus is in operation, plate ice 26 is formed upon the sides of the casings 20.

A pipe 27 is connected to the pipe 25 for the purpose of furnishing cold brine for refrigerators. The water taken from the brine by evaporation is compensated for by a water admitted through a supply pipe 28. The fresh supply of water can be taken from any source, but preferably condensed water which is free of air, is used.

Having thus described my invention what I claim and desire to secure by Letters Patent of the United States is—

1. The method of decomposing vapors or gases which comprises rarefying the vapor or gas in a vacuum chamber, subjecting the rarefied gas or vapor to the action of an electrical field within said chamber, and constantly separating the products of decomposition from the undecomposed gas or vapor.

2. The method of decomposing vapors or gases, which comprises rarefying the vapor or gas in a vacuum chamber, subjecting the rarefied gas or vapor to the action of a diffused or non-disruptive electrical field within said chamber, and constantly separating the products of decomposition from the undecomposed gas or vapor.

3. The method of decomposing vaporizable bodies or substances which comprises, constantly exhausting a vacuum chamber containing the body to withdraw vapor from the body and maintain said vapor in an attenuated state, and subjecting said vapor to an electrical discharge within the vacuum chamber.

4. The method of decomposing vaporizable bodies or substances which comprises, constantly exhausting a vacuum chamber containing the body to withdraw vapor from the body and maintain said vapor in an attenuated state, and subjecting said vapor to a diffused or non-disruptive electrical discharge within the vacuum chamber.

5. The method of decomposing aqueous liquid in a vacuum chamber which comprises maintaining a high vacuum over the liquid by a suitable exhaust mechanism, thereby withdrawing vapors from the liquid and maintaining the vapors in an attenuated state, and subjecting the vapors thus withdrawn from the liquid to an electrical field within the vacuum chamber.

In testimony whereof I affix my signature, in presence of two witnesses.

WILLIAM T. HOOFNAGLE.

Witnesses:
 THOMAS H. MCKEE,
 E. K. HOOPER.